Patented Sept. 16, 1924.

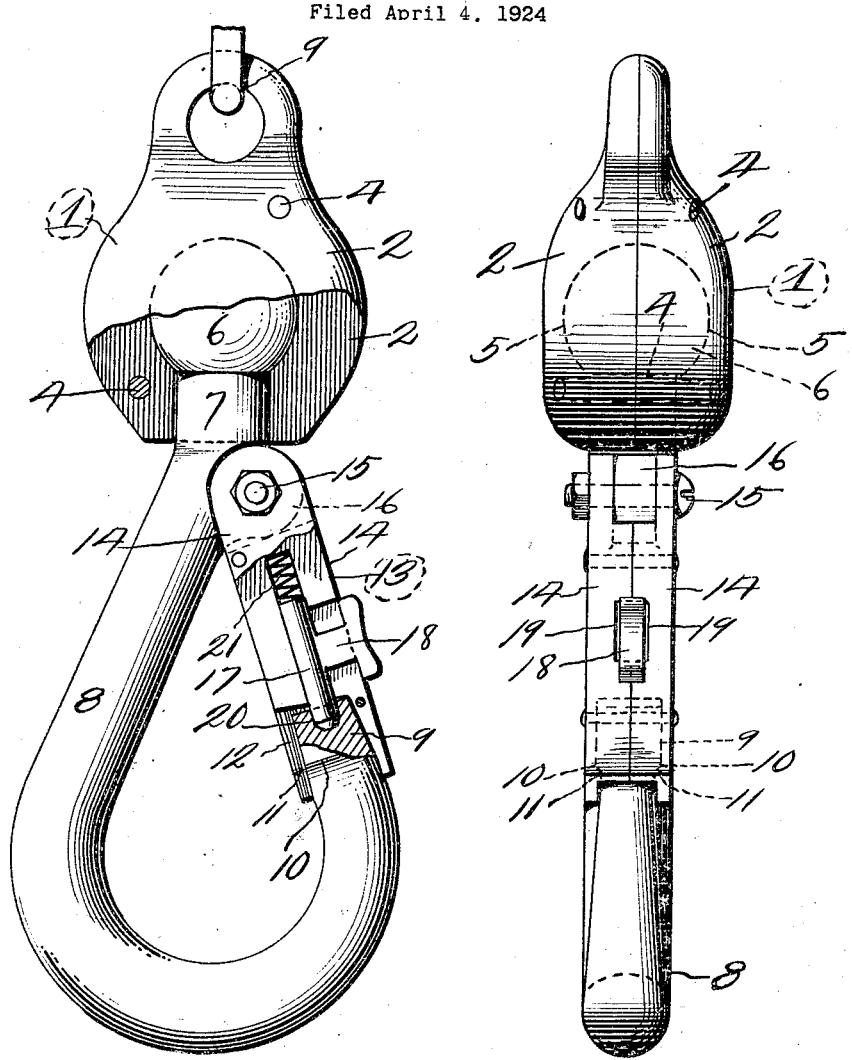

1,508,705

UNITED STATES PATENT OFFICE.

DAVID E. MAHAN, OF PORTLAND, OREGON.

SWIVEL HOOK.

Application filed April 4, 1924. Serial No. 704,278.

*To all whom it may concern:*

Be it known that I, DAVID E. MAHAN, a citizen of the United States, residing at Portland, in the county of Multnomah, State of Oregon, have invented a new and useful Swivel Hook; and I do hereby declare the following to be a full, clear, and exact description of the invention, such as will enable others skilled in the art to which it appertains to make and use the same.

The invention relates to swivel hooks, and has for its object to provide a device of this character, particularly adapted for use in connection with logging operations at logging camps, and in connection with hoisting mechanism of any kind.

A further object is to provide a swivel hook comprising a separable head formed from registering sections having semi-spherical recesses therein for the reception of a spherical head carried by the hook, thereby forming a swively mounted hook.

A further object is to provide the hook with a pivoted detent pivoted to the hook adjacent the shank thereof and cooperating with the free end of the hook for preventing a bight of a rope from coming out of the hook.

A further object is to provide a pivoted detent formed from registering sections having registering recesses for the reception of a spring actuated locking pin adapted to cooperate with an aperture in the free end of the hook, and with registering recesses for the reception of the rectangular shaped free end of the hook for bracing said hook when strain is applied thereon.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a side elevation of the swivel hook, parts being broken away to better show the structure.

Figure 2 is a front elevation of the swivel hook.

Referring to the drawing, the numeral 1 designates the head of the hook, which head is formed from registering sections 3, connected together by rivets 4, however it is to be understood that the head sections 2 may be connected together by bolts, or in any other suitable manner. The sections 2 are provided with registering semispherical shaped recesses 5, which when brought together form a spherically shaped chamber for the reception of the spherically shaped member 6 carried by the upper end 7 of the hook 8, therefore it will be seen that the hook is swively mounted and that during a hoisting operation or a log dragging operation, twisting or kinking of a cable is obviated, and that an article suspended from the hook may be twisted around without twisting the tackle to which the hook is attached at 9. The hook 8 has its end 9 rectangularly shaped, thereby forming shoulders 10, over which shoulders the shoulders 11 carried by the opposite walls of the recess 12 of the pivoted member 13 engage, thereby bracing the hook when strain is applied thereto. The pivoted member 13 is formed from registering sections 14, which sections are pivotally connected by means of a bolt 15 to an ear 16 adjacent the lower end of the shank 7, therefore it will be seen that when the pivoted member 13 is released and moved upwardly at its lower end, the bight of a rope may be easily passed into the hook, and when the pivoted member 13 is in closed position as shown in figure 1 of the drawing, the same is securely held in closed position by means of a slidable bolt 17, which is slidably mounted between the members 13. The slidable bolt 17 is provided with an outwardly extending finger engaging member 18, which extends through registering recesses 19 in the inner adjacent sides of the sections 14, therefore said bolt 17 may be easily and quickly forced out of cooperative engagement with the rectangular shaped end 9 of the hook against the action of the coiled spring 21. It will also be seen that the spring 21 will maintain the bolt 17 in closed position, and will prevent the bight of a rope from coming out of said hook, which is a common difficulty now found with hooks of this character now in use.

From the above it will be seen that a swivel hook is provided which is cheap in construction, formed from a minimum number of parts and one wherein the hook may pivot at all times thereby preventing twisting up tackle which is particularly advantageous where the device is used in connection with blocks and falls.

The invention having been set forth what is claimed as new and useful is:—

The combination with a swivelly mounted hook, said hook being provided with a pivoted catch, a rectangular shaped end carried by said hook and forming oppositely disposed shoulders, said pivoted member being provided with a spring actuated bolt slidably mounted in the pivoted member and cooperating with an aperture in the rectangular shaped end of the hook, said rectangular shaped end of the hook being disposed in a chamber in the free end of the pivoted member and shoulders disposed in said chamber and cooperating with the shoulders formed by the rectangular shaped end of the hook, whereby the hook is braced when strain is applied thereon.

In testimony whereof I have signed my name to this specification in the presence of two subscribing witnesses.

DAVID E. MAHAN.

Witnesses:
  ROSCOE G. ASHLEY,
  H. B. WITZEL.